United States Patent
Thiry et al.

[11] Patent Number: 5,657,920
[45] Date of Patent: Aug. 19, 1997

[54] ORIENTING SYSTEM FOR RIVETS AND THE LIKE

[76] Inventors: Philippe Thiry, 1310 Chamin Vide Sac, Lachute, Quebec, J8H 2C5; Jacques Laplante, 667, 17ieme rue, St. Antoine, Quebec, J7Z 3E8, both of Canada

[21] Appl. No.: 509,295

[22] Filed: Jul. 31, 1995

[51] Int. Cl.$^6$ ............ B25B 23/04; B65G 47/24
[52] U.S. Cl. ............ 227/119; 227/109; 227/135
[58] Field of Search ............ 227/119, 107, 227/135, 137, 109

[56] References Cited

U.S. PATENT DOCUMENTS

| | | | |
|---|---|---|---|
| 1,336,777 | 4/1920 | Elliott | 227/119 |
| 2,170,468 | 8/1939 | Blackman | 227/137 |
| 3,750,925 | 8/1973 | Schmidt et al. | 227/119 |
| 5,153,982 | 10/1992 | Bertocchi | 227/107 |
| 5,480,087 | 1/1996 | Young et al. | 227/119 |
| 5,588,576 | 12/1996 | Knetsch | 227/119 |

*Primary Examiner*—Scott A. Smith
*Attorney, Agent, or Firm*—Eric Fincham

[57] ABSTRACT

There are provided improvement in a system for handling components which have a stem and a head at one end thereof (such as rivets) and in particular an orienting device for rivets having a relatively short stem wherein the orienting device comprises a base having at least at a pair of co-axial grooves formed for handling different size components, a first one of the grooves having a generally U-shaped outline with a base and a first pair of arcuate walls extending upwardly therefrom, a second one of the grooves being at least partially defined by a second pair of arcuate walls extending upwardly and outwardly from a terminating point of the first pair of opposed walls, the grooves having at least one step formed therein.

5 Claims, 3 Drawing Sheets

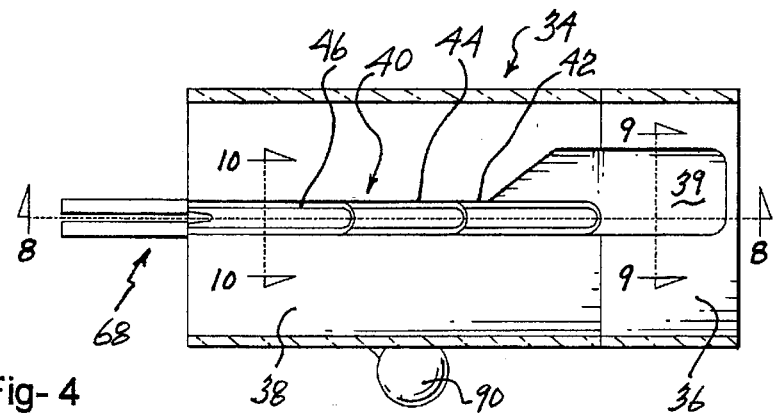
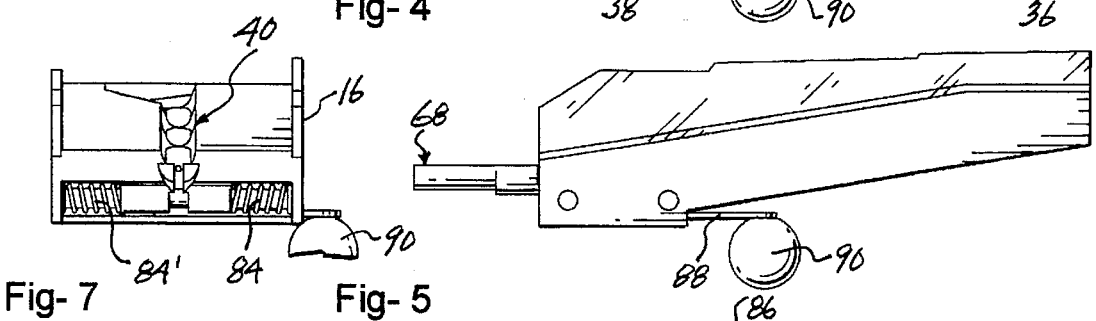
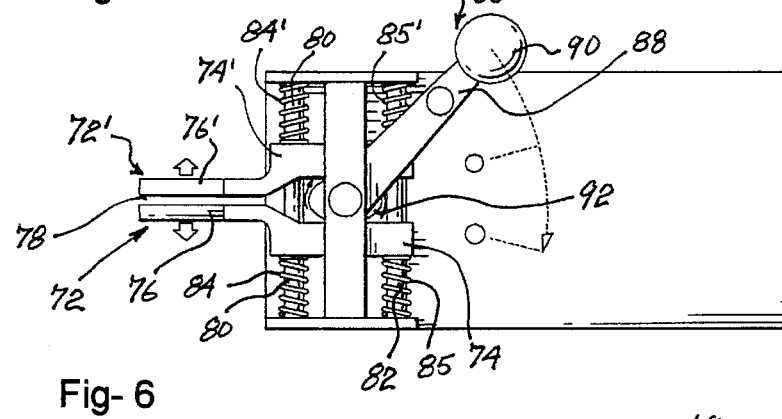
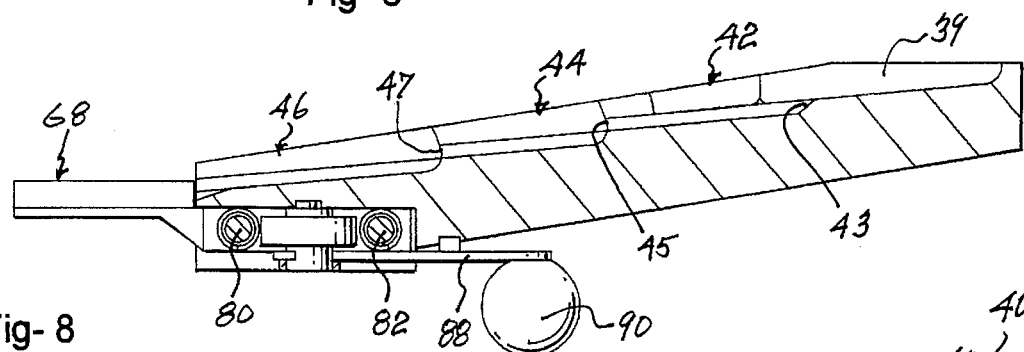
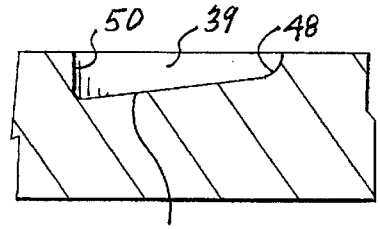
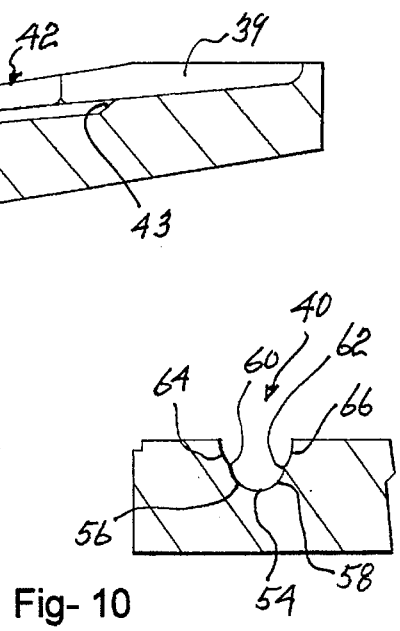

ORIENTING SYSTEM FOR RIVETS AND THE LIKE

BACKGROUND OF THE INVENTION

The present invention relates to improvements in a feeding and orientation system for articles having a stem portion and a head portion such as rivets or the like.

The feeding of small components such as rivets, nails, screws, etc. to automated equipment using the same is well known in the art and many machines exist for the feeding of such components. Normally, the components are packed in bulk and then are fed to a machine which will take the individual component and then utilize in the manner for which it is intended. Thus, for example, in the electronic industry, automated feeders are utilized to feed the electronic components to pick and place machines which take the individual component and place it on the circuit board in the desired position. Similarly, systems are known for taking articles such as rivets and feeding them to an automated riveting apparatus.

Generally, such systems for feeding individual components function well and it is known, for example, to feed the components by means of a vibratory bowl system which consists of a bowl with its associated vibrator. In this system, the components advance along a track at the periphery of a bowl to an outlet location. Components which are not properly oriented are usually automatically rejected as they proceed along a track.

In the case of objects which have a stem and a head such as rivets and screws, the systems have a relatively high degree of high reliability as long as the stem has a length which is greater than the diameter of the head portion. However, when the length of the stem approximates or is less than the diameter of the head, problems occur in properly aligning the components. This problem is compounded when a machine is obligated to select from a number of different sources of like components. For example, in the case of rivets, the riveting of an article may require different size rivets at different locations. In such an instance, usually a different vibratory bowl is required for each rivet size and one then has a problem of feeding the different rivets to a common point where the riveting apparatus will utilize the desired size of a rivet.

SUMMARY OF THE INVENTION

According to a first aspect of the invention, there is provided an orienting device for handling components having a stem and a head at one end thereof wherein the orienting device comprises a base having a trough formed therein. The trough has a cross sectional configuration defining at least first and second grooves therein. A first one of the grooves has a generally U-shaped outline with a base and a first pair of opposed arcuate walls extending upwardly therefrom and a second one of the grooves being at least partially defined by a second pair of opposed arcuate walls extending upwardly and outwardly from a terminating point of the first pair of opposed arcuate walls. The trough has at least one step formed therein.

According to a further aspect of the present invention, in a system for handling components which have a stem and a head at one end thereof and wherein the system includes an orienting device having an exit slide at one end thereof, there is provided an improvement wherein the exit slide includes a pair of spaced apart members which define a channel therebetween. An upper surface of the spaced apart members is adapted to receive and support an Underside of the head of the component. There are provided means for adjusting the members to vary the width of the channel. The adjustment means include an adjustment element adapted to fit between the members and which adjustment element has an irregular configuration such that movement of the adjusting element will vary the width between the members.

In a further aspect of the invention, there is provided a system for feeding components which have a stem and a head at one end thereof, the system comprising a vibratory bowl feeder means, an exit ramp associated with the bowl feeder and a conduit adapted to receive the components therefrom. A compressed air means is adapted to blow the components to an outlet of the conduit wherein an aperture chamber operatively connected to the conduit outlet receives the component. There is an exit from the chamber adapted to deliver a component when required and an orienting device to receive the component from the exit.

In greater detail, the improvements of the present invention can be incorporated into many different component feed arrangements. They may be incorporated in a dedicated system for one size of component or alternatively, may be utilized in conjunction with the feeding of many different types of components.

The use of vibratory bowl feeds is, as previously mentioned, well known in the art and the practice of the present invention preferably incorporates one or more of such vibratory bowl feeders. In operation, these feeders vibrate such that components follow a track on the interior periphery of the bowl and are fed to a output track.

The present invention can, however, be utilized with or without such a feeder. It is possible for any suitable feeder capable of providing a single component to be utilized in conjunction with the present invention.

In one embodiment of the invention, a compressed air source may be used to deliver the components to a feeding station.

In one aspect of the present invention, there is provided an orienting device which can receive a single component and orient it in the desired direction—i.e. the stem in a leading position. Furthermore, the orientation section is adapted to receive a number of different sizes of components thus negating the requirement for replacing the section when a different size component is required.

To this end, the orientation section has a trough formed therein and which trough is characterized by having a "double" groove profile. In other words, the base of a first groove is formed in a generally U-shaped configuration and which groove formed in the base is adapted to receive a first range of component sizes.

At the upper end of the walls of the U, the side walls defining the trough extend outwardly and upwardly such that a second groove or channel is defined between the walls. This second channel or groove is adapted to orient a second sized range of components. The trough is formed with at least one and preferably a plurality of steps therein.

Following orientation of the component by the trough, there is preferably provided an adjustable exit mechanism. Since the trough is capable of handling a number of different sizes of rivets or like components, it is also desirable that the exit slide or mechanism be capable of so doing.

To this end, there is preferably provided an exit arrangement wherein the stem of the component will fit within a channel defined by two members with the head resting on a upper surface thereof.

In a particularly preferred arrangement, there are provided members which are adjustable toward and away from each other to define the channel therebetween. A preferred mechanism uses an eccentric or irregularly shaped element to move the members to the desired position.

When feeding the component to the orientation device, one arrangement which is typically used is that of a compressed air transport. While several arrangements are possible, a preferred one is wherein the component is forwarded through a compressed air arrangement from where it exits into a decompression or exit chamber from where it is subsequently fed to the orientation device. To this end, there may be provided an arrangement wherein the component is fed by compressed air through a tube or conduit through the chamber which will then feed it through a suitable feeding arrangement to the orientation device.

Having thus generally described the invention, reference will be made to the accompanying drawings illustrating an embodiment thereof, in which:

BRIEF DESCRIPTION OF THE DRAWINGS

FIG. 4 is a top plan view of the orienting device and slide of FIG. 3;

FIG. 5 is a side elevational view thereof;

FIG. 6 is a bottom plan view thereof;

FIG. 7 is an end elevational view thereof;

FIG. 8 is a sectional view taken along the lines 8—8 of FIG. 4;

FIG. 9 is a sectional view taken along the lines 9—9 of FIG. 4; and

FIG. 10 is a sectional view taken along the lines 10—10 of FIG. 4.

DETAILED DESCRIPTION OF THE INVENTION

Figure 1:
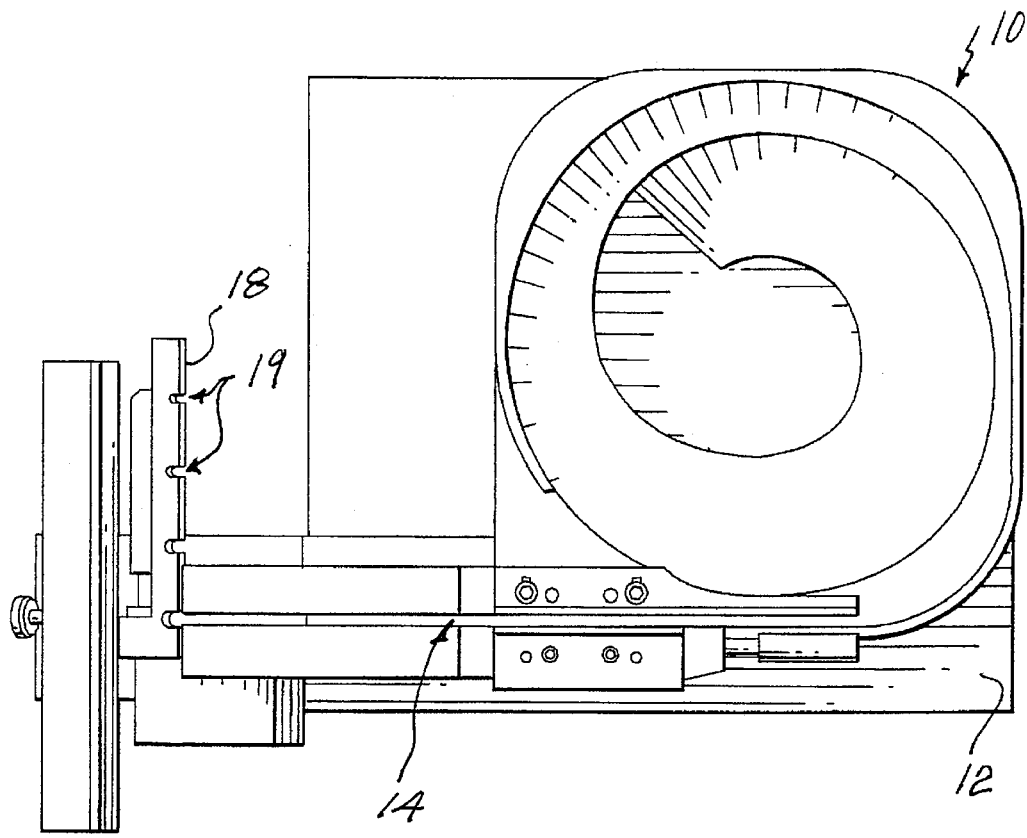
FIG. 1 is a top plan view of a vibratory bowl feeding arrangement.
Figure 2:
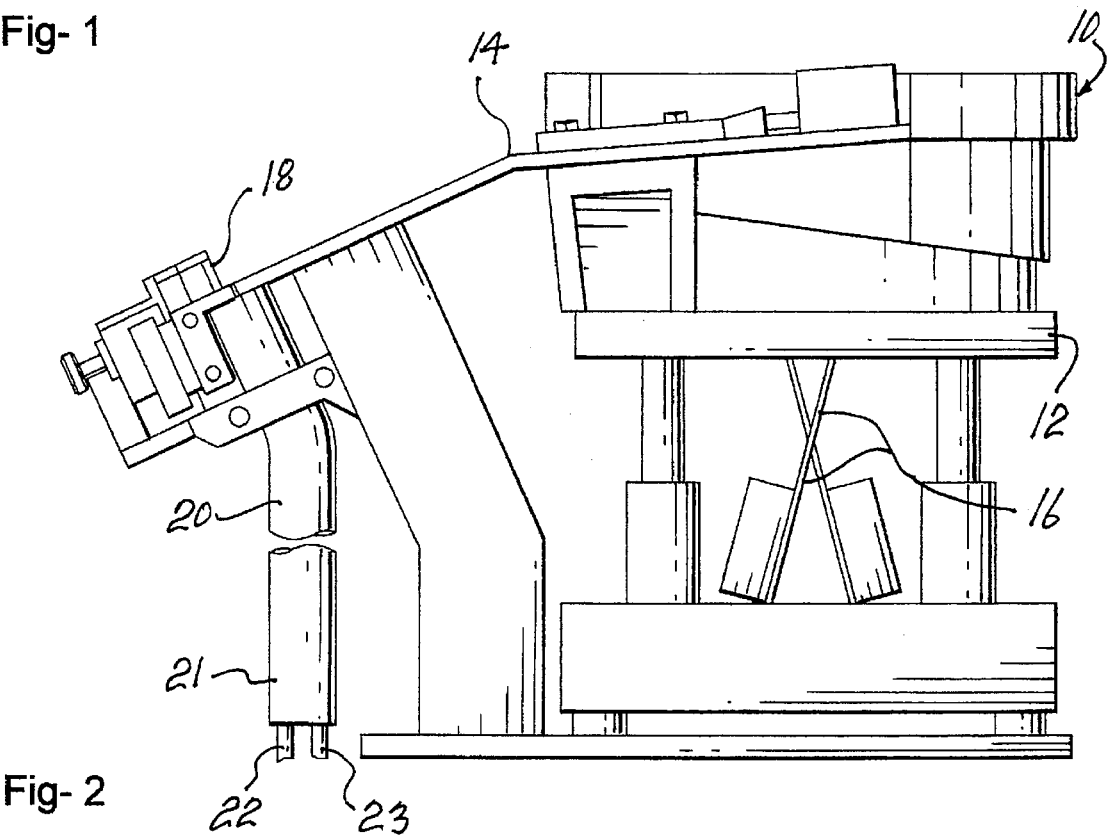
FIG. 2 is a side elevational view thereof.

Referring to the drawings in greater detail and by reference characters thereto, there is illustrated a bowl feeding system which includes a vibratory bowl generally designated by reference numeral 10 and which is mounted on a suitable base or drive 12. An exit track 14 is provided from vibratory bowl 10. As may be seen in FIG. 2, members 16 form part of the vibration system for the bowl.

Conveniently, the vibratory bowl feeder includes a discharge tube 20. In conjunction with the discharge tube 20, there may be provided a gate 18 having a plurality of different size notches or apertures 19 formed therein for different size components.

Figure 3:
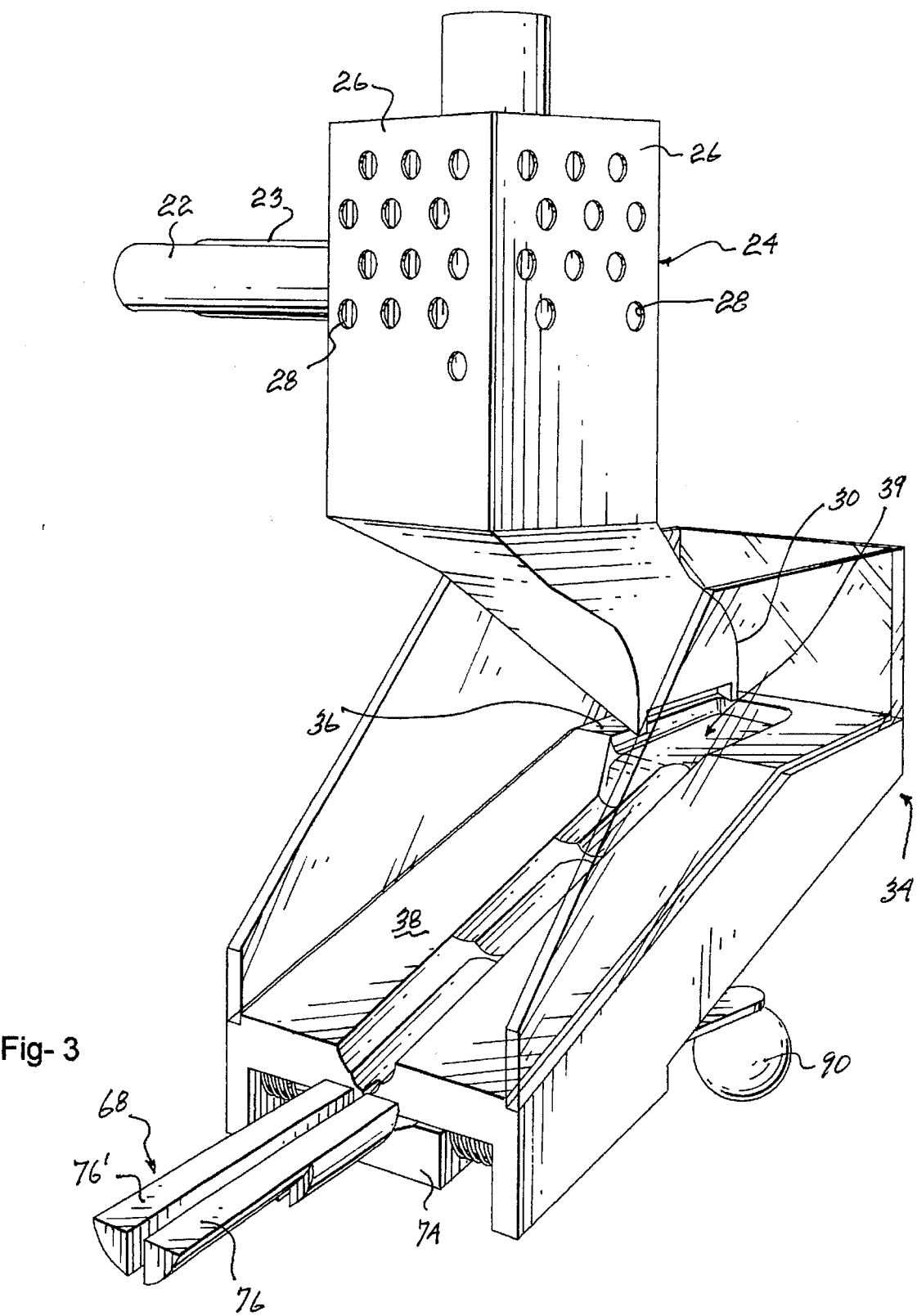
FIG. 3 is a respective view of an orienting device according to the present invention along with the feed arrangement therefor and the exit slide.

From discharge tube 20, the individual components are fed by a compressed air arrangement to an orienting device generally designated by reference numeral 34 in FIG. 3. In this respect, discharge tube 20 is connected to an air propulsion device 21 from which there are two tubes 22 and 23 which terminates in an input chamber 24. Input chamber 24 is defined by a plurality of walls 26, the walls having apertures 28 formed therein. This arrangement allows for exit of the air when the component has been delivered through input tube 22. Chamber 24 also has a pair of doors 27 which are adapted to receive a component and deliver the same when required. Thus, chamber 24 also functions as a waiting station for an individual component.

From chamber 24, the components are delivered through a guide device 32 to orienting device 34.

As will be seen from FIGS. 3 to 9, orienting device 34 includes an upper surface having a horizontal portion 36 and an inclined or sloped portion 38. Formed in horizontal surface 36 is an input area generally designated by reference numeral 39 while formed in inclined surface 38 is an orienting trough generally designated by reference numeral 40.

Orienting trough 40 has three sections—an upper section 42, a middle section 44, and a lower section 46.

Input area 39 is defined by a first side wall 48 and a second side wall 50 with a base bottom 52 extending therebetween. As will be seen in FIG. 9, side wall 50 has a greater depth than side wall 48 such that the base surface 52 is sloped to provide a feed to upper section 42 of orienting trough 40.

Orienting trough 40 has a substantially identical configuration throughout its sections and which may be best seen in FIG. 10 and will now be referred to. As may be seen, orienting trough 40 includes a first U-shaped section having a bottom 54 with a pair of upwardly extending side walls 56 and 58 which terminate at points 60 and 62 respectively. At this point, a second co-axial groove is formed with arcuately extending side wall portions 64 and 68 defining a second sized channel or groove within orienting trough 40. This arrangement permits the orienting trough to handle different size of components with a smaller size component fitted within the lower groove while the larger components fit within the upper groove with the head portion resting on points 60 and 62.

As may be seen, input area 39 communicates with upper section 42 of orienting groove 40 and includes a drop or step generally designated by reference numeral 43. Similarly, a step 45 is provided between upper section 42 and middle section 44 and a third step 47 is provided between middle section 44 and lower section 46.

At the lower end of lower section 46, there is provided an exit slide generally designated by reference numeral 68. Exit slide 68 is defined by a first member 72 and a second member 72', both of which are substantially identical and thus similar reference numerals are employed.

Member 72 includes a body portion 74 and an arm portion 76. Defined between arm portions 76 and 76' is a slot 78 adapted to receive the component from orienting trough 40. A pair of shafts 80 and 82 extend between side walls 70 of orienting device 34. Body portions 74 and 74' are mounted on shafts 80 and 82. Extending between body portion 74, 74' and side walls 70 are springs 84, 84', 85, and 85'.

For adjusting the opening for size of slot 78, there is provided an adjustment member 86 which includes a lever 88 having mounted thereon a handle 90. At the opposed end, there is provided an eccentric member 92 which is mounted between body portion 74 and 74'. As may be seen, movement of adjustment member 86 will cause movement of arm portion 76, 76' to thereby vary the width of slot 78. Locking means (not shown) may be provided for locking the device in a desired position.

Thus, for example, one could utilize a trough which has more than two co-axial grooves formed therein and the number of steps in the trough may be varied.

It will be understood that the above described embodiment is for purposes of illustration only and that changes and modifications may be made thereto without departing from the spirit and scope of the invention.

What is claimed is:

1. An orienting device for handling components having a stem and a head at one end thereof, said orienting device comprising a base having a trough formed therein, said trough having a cross sectional configuration defining at least first and second grooves therein, a first one of said grooves having a generally U-shaped outline with a base and a first pair of opposed arcuate walls extending upwardly therefrom, a second one of said grooves being at least partially defined by a second pair of opposed arcuate walls extending outwardly and upwardly from a terminating point of said first pair of opposed arcuate walls, said trough having at least one step formed therein.

2. The device of claim 1 wherein said trough has a plurality of steps formed therein.

3. The device of claim 1 further including vibrating means operatively associated with said base.

4. The device of claim 1 further including an exit slide at an output end thereof.

5. The device of claim 1 further including an input area, said input area comprising a recess formed in said base, said recess having a sloped bottom wall adapted to feed said trough.

* * * * *